United States Patent
Cloutman

(10) Patent No.: US 8,254,470 B2
(45) Date of Patent: Aug. 28, 2012

(54) ENCODING AND DECODING OF EMBEDDED DATA STREAM IN ANALOG VIDEO USING COPY PROTECTION PULSES

(75) Inventor: John Cloutman, Tracy, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 1121 days.

(21) Appl. No.: 12/132,469

(22) Filed: Jun. 3, 2008

(65) Prior Publication Data

US 2009/0296807 A1    Dec. 3, 2009

(51) Int. Cl.
*H04B 14/04* (2006.01)
(52) U.S. Cl. .................................. 375/242; 375/240.16
(58) Field of Classification Search .................. 370/237, 370/238, 239, 240.01, 241; 375/237, 238, 375/239, 240.01, 241
See application file for complete search history.

(56) References Cited

U.S. PATENT DOCUMENTS

| | | | |
|---|---|---|---|
| 4,577,216 A | 3/1986 | Ryan | |
| 4,631,603 A | 12/1986 | Ryan | |
| 4,819,098 A | 4/1989 | Ryan | |
| 5,822,425 A | 10/1998 | Ezaki et al. | |
| 6,188,832 B1 | 2/2001 | Ryan | |
| 6,256,392 B1 | 7/2001 | Sako et al. | |
| 6,516,132 B1 | 2/2003 | Wrobleski et al. | |
| 6,587,638 B1 | 7/2003 | Watanabe et al. | |
| 6,836,549 B1 * | 12/2004 | Quan et al. | 380/221 |
| 7,065,211 B1 | 6/2006 | Sako et al. | |
| 2004/0057698 A1 | 3/2004 | Frederick et al. | |
| 2005/0084102 A1 | 4/2005 | Hollar | |
| 2005/0117749 A1 * | 6/2005 | Quan | 380/201 |

FOREIGN PATENT DOCUMENTS

| | | |
|---|---|---|
| EP | 0 855 837 A2 | 7/1998 |
| WO | WO-2005/039176 A1 | 4/2005 |

OTHER PUBLICATIONS

International Search Report mailed Jan. 13, 2010, for PCT Application No. PCT/US2009/046024, filed on Jun. 2, 2009, seven pages.
Written Opinion mailed Jan. 13, 2010, for PCT Application No. PCT/US2009/046024, filed on Jun. 2, 2009, three pages.

* cited by examiner

*Primary Examiner* — Brenda H Pham
(74) *Attorney, Agent, or Firm* — Morrison & Foerster LLP

(57) ABSTRACT

Method and apparatus for encoding and decoding a stream of digital (binary) data on AGC (automatic gain control) pulses or back porch pulses of the type conventionally used for copy protection in the analog television or video realm. The data is encoded onto the tips of the AGC or back porch pulses added to blanking intervals of an analog video signal. Each pulse tip may define, for instance, 10 to 15 digital bits (1 or 0) in the form of square waves or rectangular waves with two states, high and low, representing respectively 1 and 0. In another version, the digital data is similarly encoded onto the pulse tip of back porch pulses present at the end of video fields for copy protection. This digital data conveyed in an analog signal may be read by an associated decoder in a consumer device and the resulting data decoded, for instance, for copy control, storage permission, network access, user identification, or carrying additional data, such as commentary or text relevant to the accompanying video. The data bandwidth here is substantial since each AGC or back porch pulse may carry, for instance, 15 bits of digital data and the AGC or back porch pulses may be present in each of the horizontal and vertical blanking intervals of a video signal.

20 Claims, 6 Drawing Sheets

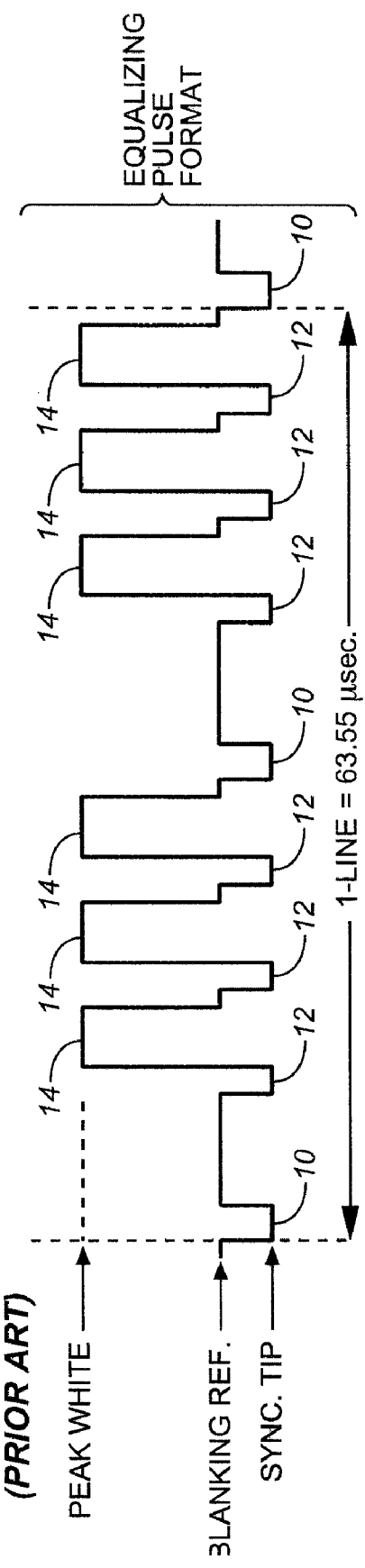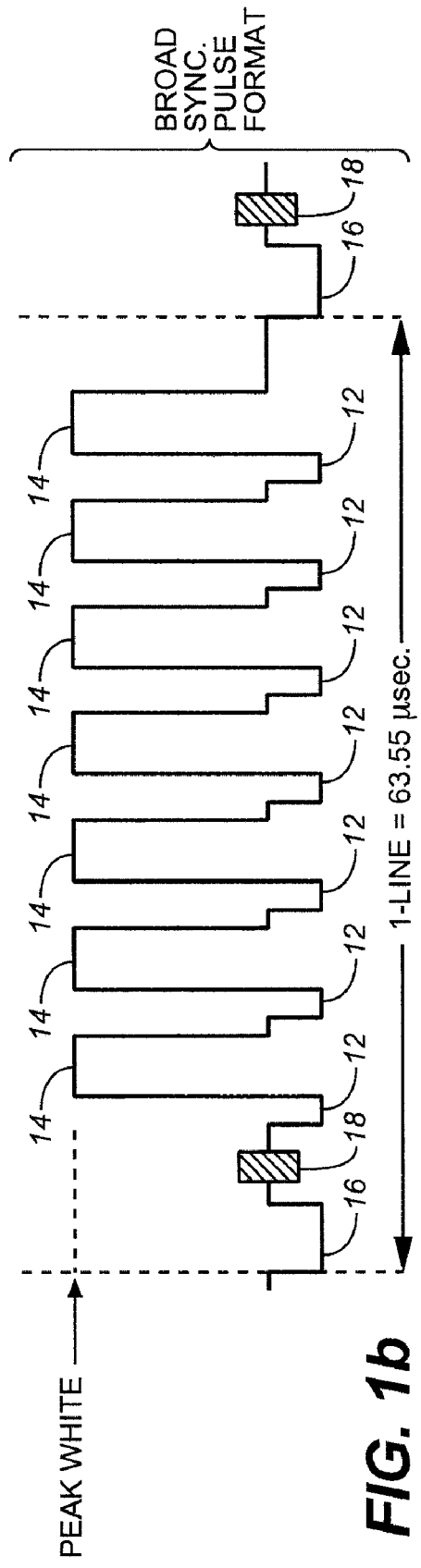
FIG. 1a (PRIOR ART)
FIG. 1b (PRIOR ART)

ENCODING AND DECODING OF EMBEDDED DATA STREAM IN ANALOG VIDEO USING COPY PROTECTION PULSES

FIELD OF THE INVENTION

This invention relates to video and more specifically to conveying digital data in an analog video signal.

BACKGROUND

The technical problems of video use control, such as video copy inhibition and copy control, are well known. These are techniques to prevent or discourage unauthorized copying of typically copyrighted movies or television programs or other video material. An example of copy inhibition is disclosed in Ryan U.S. Pat. No. 4,631,603 assignee Macrovision Corp. and incorporated herein by reference in its entirety, wherein an analog video signal is modified so that a television receiver will still provide a normal color picture from the modified video signal, while a video tape recording of the modified video signal when replayed produces generally unacceptable television pictures. This operates in the analog television domain. This "AGC" method relies on the fact that particular videocassette recorder (VCR) automatic gain control systems cannot distinguish between normal "sync" (synchronization) pulses of a conventional video signal and added "pseudo-sync" pulses. U.S. Pat. No. 4,631,603 discloses adding pseudo-sync (negative-going) pulses paired with positive-going ("automatic gain control") pulses in the vertical blanking intervals of a television signal in order to result in unacceptable picture quality during playback of a recorded analog video signal.

Also well known are various copy control techniques suitable for use with either analog or digital video wherein a watermark or some other coded data is included in a video signal and is detected by an especially adapted video recorder. The video recorder upon detecting the watermark or coded data either permits or does not permit copying. In some cases, generational (e.g., copy once only) copy control is thereby provided.

The pseudo-sync and AGC-type pulses of U.S. Pat. No. 4,631,603 are shown here in FIGS. 1a and 1b, identical to FIGS. 1a and 1b of that patent where the horizontal scale is time and the vertical scale voltage, conventionally. The waveform of FIG. 1a illustrates a conventional video signal at a portion thereof having normal equalization pulses 10, but adapted in accordance with U.S. Pat. No. 4,631,603. The equalizing pulses are negative-going pulses which extend from the blanking reference signal level (marked on the vertical axis of FIG. 1a) down to the sync tip level (also marked on the vertical axis of FIG. 1a). In accordance with U.S. Pat. No. 4,631,603, a plurality of pulse pairs (e.g., adjacent pulses 12 and 14) are inserted after the equalizing pulse 10. As shown in accordance with NTSC television, a single tracing line or horizontal scan line for a television signal is approximately 63.55 microseconds in length as shown in FIG. 1a. Hence reference characters 12 of FIG. 1a illustrate the pseudo-sync pulses. Further each pseudo-sync pulse 12 is paired with an immediately following positive pulse 14. The positive pulses are also referred to as AGC or automatic gain control pulses since they affect the AGC circuit of a television receiver. In this case, the amplitude of the positive pulses is roughly equivalent to the amplitude of the peak white signal.

As stated above, the automatic gain control system of a typical videocassette recorder cannot distinguish between an equalizing pulse 10 and a pseudo-sync pulse 12 and therefore loses synchronization and hence loses proper recording signal reference level and fails to make an acceptable recording of the modified video signal.

FIG. 1b shows a waveform of U.S. Pat. No. 4,631,603 as applied to a horizontal scan line in the vertical blanking region having a normal horizontal synchronization pulse 16. This is followed by the conventional color burst information 18. In this case, seven pulse pairs of pseudo-sync pulses 12 and positive pulses 14 are inserted into the video signal after the sync pulse 16 and within the vertical blanking interval. The inclusion of seven such pairs in FIG. 1b is merely exemplary. Typically the positive or AGC pulses, as they are also known, have amplitudes extending to the clipping level of the medium through which the modified video signal must be transmitted. Typically this is between 100% and 125% of the peak white reference level. A typical duration of each of the AGC pulses 14 is 3 microseconds, although it may be shorter.

Also known is another copy protection technique also referred to as copy inhibition disclosed in Ryan U.S. Pat. No. 6,188,832, assignee Macrovision Corp. and incorporated herein by reference in its entirety. This discloses modifying a video signal so that a television/receiver still receives a normal picture from the modified signal whereas a video tape recording of this signal produces generally unacceptable pictures. This again exploits the automatic gain control circuitry in video tape recorders and their differences from the automatic gain control circuitry in television receivers and monitors. In this disclosure a portion of the back porch intervals following the trailing edges of a substantial number of horizontal sync pulses are significantly raised and lowered to improve the playability of the original signal without reducing the effectiveness of the copy protection of the copied signal. This is achieved by adding pulses to selected lines of the video signal during the back porch interval of horizontal blanking intervals. These pulses significantly raise or lower the voltage amplitude during the blanking interval so as to provide a signal for which the average voltage amplitude value is approximately equal to that of the blanking interval. This modification is typically made in a number of selected horizontal scan lines of the video signal typically clustered together and typically adjacent to a vertical blanking interval, in other words, near the end of the video field. However, this is not limiting.

FIG. 2 shows Ryan U.S. Pat. No. 6,188,832 FIG. 3 showing a portion of a waveform of a video signal modified in accordance with this back porch pulse copy protection technique. The waveform portion illustrated in present FIG. 2 is a portion of the video signal during the horizontal blanking interval. A positive pulse 26 has been added to the video signal immediately following the trailing edge of a horizontal sync pulse 22. For maximum effect, the amplitude of pulse 26 should be such as to raise the back porch voltage to a level of peak white or greater as shown in FIG. 2. A typical value of this positive pulse is 127 IRE units in the NTSC television format. The pulse width of the positive added pulse should be wide enough to overcome the limited video bandwidth of a typical recording video cassette recorder. This pulse is disclosed as being at least 750 nanoseconds in duration and is 1 microsecond in FIG. 2. Also shown in FIG. 2 are the conventional color burst 28 and the back porch video signal level at 24 and 30. The time durations of the various portions of this exemplary waveform are also indicated in microseconds in FIG. 2. Also disclosed in U.S. Pat. No. 6,188,832 is a typical circuit to generate such back porch pulse modification signals.

It is also known to use copy protection signals such as AGC pulses for purposes of controlling subsequent permitted use, such as storage or recording. See U.S. patent application Ser.

No. 10/753,844 filed 7 Jan. 2004, published as WO2005/039176A1, inventor Mark A. HOLLAR, incorporated herein by reference in its entirety. This discloses a method and apparatus for controlling subsequent permitted use, such as storage, of video on a digital storage device, such as a personal video recorder. In this case, an analog video signal is provided with at least one modification to its video characteristics, for instance in the horizontal blanking interval and vertical blanking intervals, which is of the type having the capacity to inhibit making an acceptable analog of a recording of the analog signal. This is typically, for instance, the above-described AGC pulse addition or it may be the color stripe modification, also known in the field as developed by Macrovision Corp., see Ryan U.S. Pat. No. 4,577,216 and Wrobleski et al. U.S. Pat. No. 6,516,132, both incorporated herein by reference in their entirety. In the color stripe process, the color burst conventionally present in the horizontal blanking interval in each line of active video in the analog domain is modified in terms of its phase so that any subsequent video tape recording of the video signal shows undesirable variations in the color fidelity that appear as bands or stripes of color error.

WO2005/039176 uses the presence or absence of these types of copy inhibition modifications to serve as a type of code to carry information as to the subsequent permitted use in the digital realm, such as whether the accompanying content of the video signal is allowed to be digitally recorded in digital form, and if it is allowed to be recorded, also the length of time that the recording is allowed to persist. Hence in this case the modifications to the analog video signal have a dual use in both inhibiting recording in the analog realm and carrying information across the analog video interface so as to control storage (copying) or other use of the video in the digital realm.

In the disclosure of WO2005/039176, the copy inhibition processes are provided in a pattern used to carry data controlling uses of the video, such as a permitted subsequent digital storage of the video signal, for instance in a personal video recorder. In one embodiment, the AGC and color stripe processes are each present (on) or not present (off). Since there are two such processes each with two conditions (present or not), this provides four different states in one embodiment, in other words providing in effect a four bit digital value. Thus each state has a coded meaning in terms of copy control, for instance the first state indicates there is no copy control in storage, for instance in a PVR, as permitted with no limitation. The second state indicates storage is not permitted. The third state indicates that duration of storage in terms of, for instance, hours, days, etc. The fourth state indicates a storage is permitted, but of the specified duration only.

Also known in the television field is conveyance of information for an analog TV signal in the 21st line of a video field and the vertical blanking interval. For instance, close captioning and CGMS (copy generation restriction management system) impose what amount to digital signals in this particular scan line. However, it is noted that this particular line, in fact, is typically reserved, for instance, in NTSC television specifically for carrying close captioning and CGMS data. This is according to an FCC standard. Moreover, there is only one scan line provided for this per video field since it is in the vertical blanking interval and occupies the entire line. Hence not only is this a government mandated information conveyance approach it also has very restricted bandwidth in terms of how much information is carried per field. (A field in television is one-half a frame comprising the even or odd numbered lines in a frame; two such fields together make up a frame where there are 30 frames per second displayed in NTSC television.) The same general approach is used in other television systems which are SECAM and PAL with slightly different parameters. Such a system is described in Ezaki et al. U.S. Pat. No. 5,822,425.

SUMMARY

In accordance with this disclosure, a method of carrying data in a video signal using conventional copy protection processes is disclosed. In one embodiment a stream of digital (binary) data is encoded by an encoder as disclosed here onto each of the AGC pulse waveforms. The actual encoding of data is at the tip (extremity) of each AGC pulse waveform. Thus rather than the mere presence or absence of a group of AGC pulses carrying data, instead each AGC pulse waveform is modified at its tip to express a string of digital values, typically 1 and 0, where, e.g., digital value 1 would be a high amplitude signal and 0 would be a low amplitude signal. This allows, for instance, the expression of 10 or 15 digital bits per AGC pulse and it is understood that there may be several AGC pulses per blanking interval; hence a relatively large amount of information may be conveyed.

Alternately, the digital data is similarly encoded onto the tip of a copy protection back porch pulse waveform typically located in the vertical blanking interval at the end of a video field, or onto any similar copy protection pulse having a suitable waveform which can accommodate the digital data.

Complementary decoder devices as disclosed here read the encoded data stream and may take action based on the decoded data values or send a corresponding command to allow action to be taken. For instance, the digital data may indicate information relating to copy protection, storage permission, network access entitlement, user identification, mobile device activation and registration and other applications. This has an advantage over WO2005/039176 of conveying substantially more information (data) per video field and further does not require use of several copy protection processes, such as both AGC and color stripe and others, because here all of the information can be conveyed on only the AGC-type or back porch copy protection pulses. A typical application, for instance, is television pay per view where an MAC (Media Access Control) address may be encoded using a unique identification number for control purposes, so that the video stream can be played only by a particular set top box with a matching address. This can be used for pay per view television so that if someone illegally taps into, for instance a cable television system, he cannot use that video stream since the encoded data would indicate use only by the intended addressee.

BRIEF DESCRIPTION OF THE DRAWINGS

FIG. 1a shows in the prior art copy protection pseudo sync and AGC pulses; FIG. 1b is a variant of FIG. 1a.

FIG. 3b shows detail of FIG. 3a.

DETAILED DESCRIPTION

Figure 2:
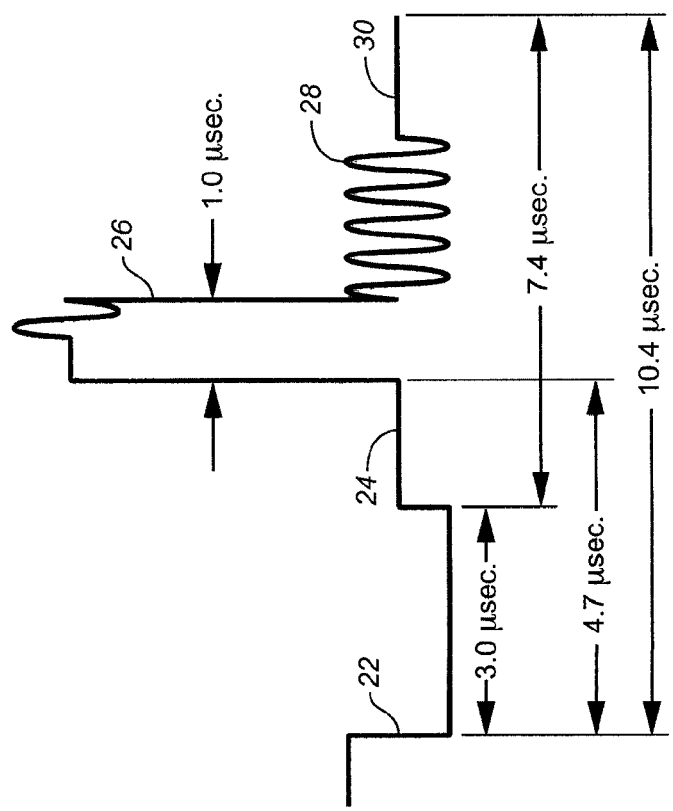
FIG. 2 shows in the prior art a back porch copy protection pulse.
Figure 3A:
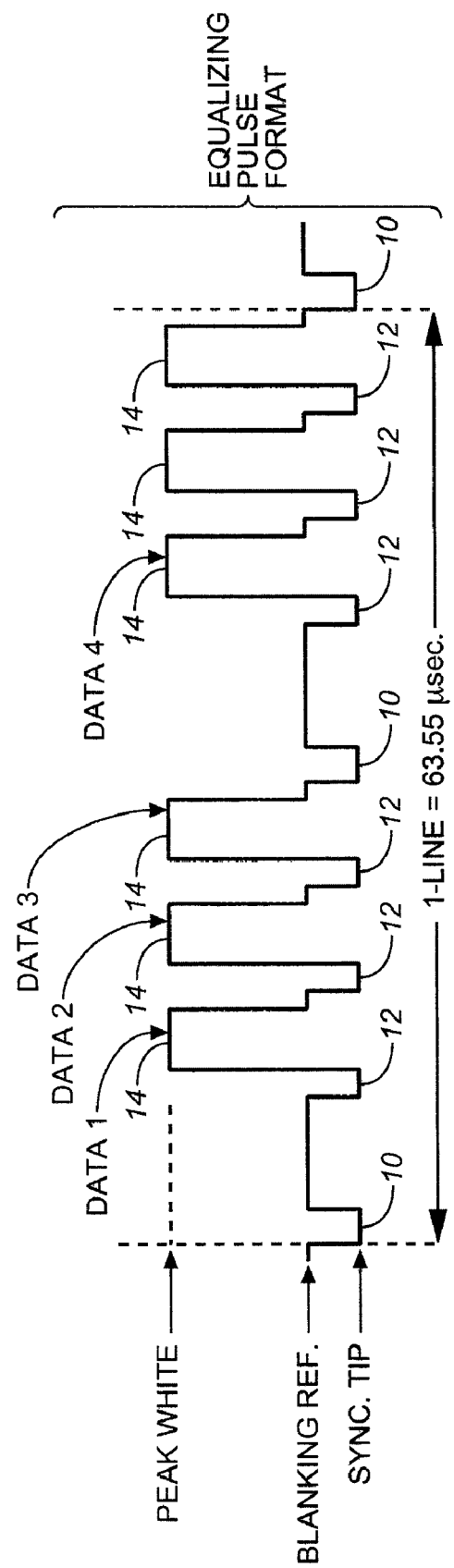
FIG. 3a shows an AGC encoded waveform in accordance with the invention.

FIG. 3a shows a modified version of the conventional AGC and pseudo-sync pulse pairs of FIG. 1a (or FIG. 1b) with the change that digital data has been encoded onto the tips of the AGC pulses 14. This data is shown here as Data 1, Data 2, Data 3, Data 4 indicating that a plurality of bits of data are encoded onto each pulse tip. "Tip" here refers to the upper most portion of the pulse in this particular view. Of course, often these waveforms are depicted inverted to the presentation of FIG. 2a; however, the tip is in any case the extremity of the copy protection pulse furthest from blanking level. It is to be understood that typically in the prior art as shown in FIG. 1a, the AGC pulses have a relatively flat top (tip) more or less and a total duration of 1-3 microseconds. It has been determined that these pulse tips may in fact be modified so as to carry data as indicated in FIG. 3a.

Figure 3B:
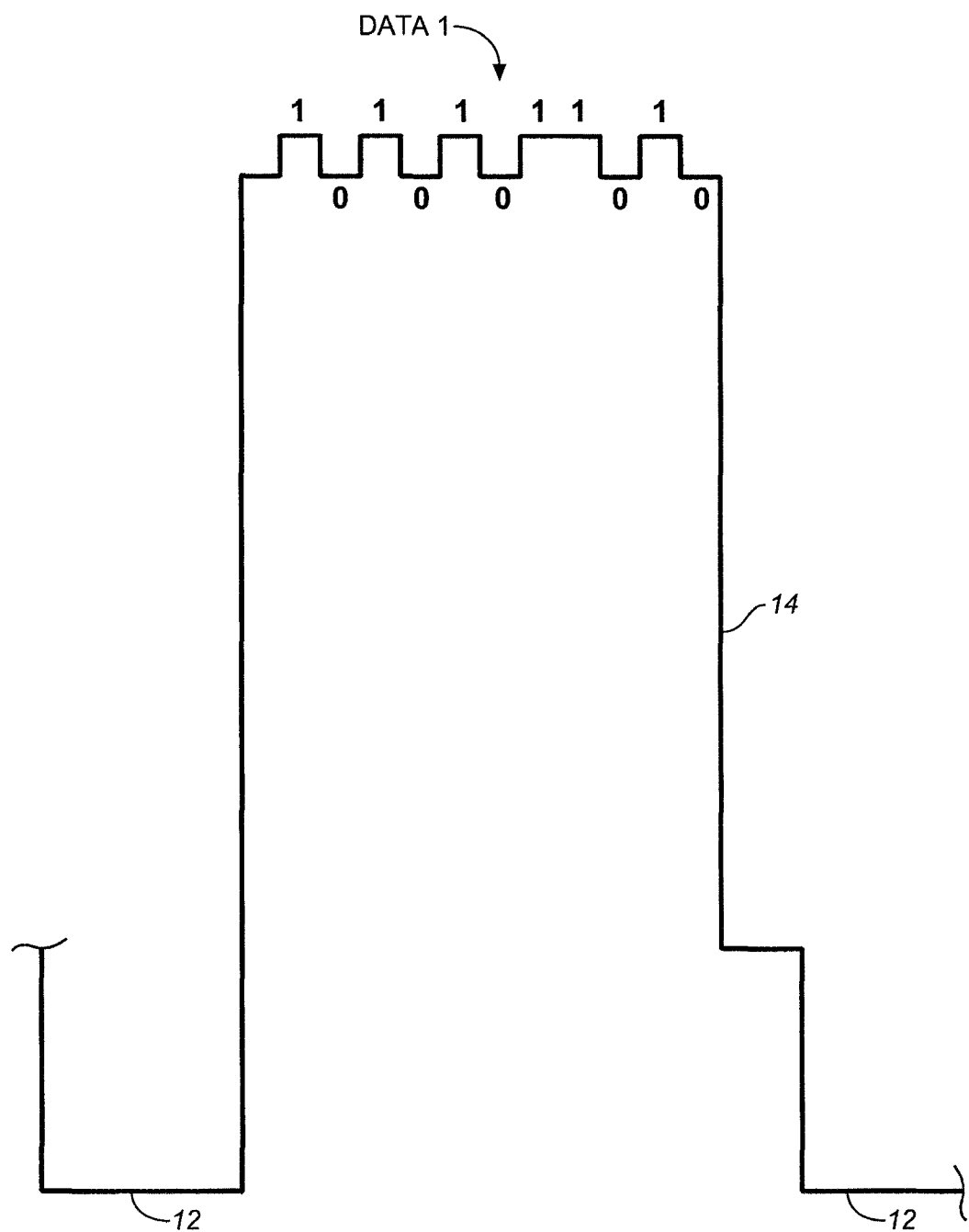

Detail of how the data is carried is shown in FIG. 3b, which shows the tip of a single AGC pulse 14 where in one embodiment the tip of pulse 14 is modified to define a set of rectangular waveforms, which are alternating high and low levels (voltages) to define Data 1. This waveform, of course, in the digital domain can represent digital bits indicated as being 1 and 0, where 1 is the higher level and 0 is the lower level (or vice versa). Hence Data 1 is the digital data 10101011010. As shown here, a single AGC pulse tip may carry multiple bits, such as up to 15 bits, however this is not limiting. As shown for instance in FIG. 1b, a single vertical blanking interval may have as many as seven or more AGC pulses which would give in this case a capacity in excess of 100 bits of digital data for a single vertical blanking interval. The depicted use of rectangular waveforms to indicate the digital data bits is not limiting.

Note also that such AGC pulses may be added to horizontal blanking intervals of a video signal, although there is room (in terms of time) for relatively few AGC pulses in a typical horizontal blanking interval, which has a duration of 10.8 microseconds in NTSC TV. However there is typically room for one or two pulses before or even after the color burst. Moreover of course, AGC pulses may also be extended into the overscan area of the television signal thus providing more room in the horizontal blanking interval. It is noted that the typical back porch duration of a horizontal blanking interval (the portion of the horizontal blanking interval following the actual horizontal synchronization pulse) is approximately 4.7 microseconds, of which only a portion is occupied by the color burst. Hence there is room for typically for at least one or two AGC pulses, especially if they are relatively short duration, such as only 1 microsecond. Hence in this case, each horizontal blanking interval may carry one or two or three AGC pulses, thus carrying another 15 to 45 bits of data. Since in this case each scan line of the television signal will carry as much as 45 or more data bits, the entire video field may carry (each field having approximately 260 scan lines in NTSC television) nearly 12,000 bits. This is substantial bandwidth for information carriage. It is orders of magnitude greater bandwidth than that of publication WO2005/039176 which only carries 4 bits per field.

In FIG. 3b, the actual duration of each bit (rectangular wave element) is approximately 0.2 microseconds. (This assumes 15 bits in a 3 microsecond wide AGC pulse.) A typical range for the duration of each bit is 0.1 to 0.33 microseconds. The amplitude of each bit is approximately 70 mV, having a typical range of 25 to 125 mV. None of these values of course is limiting and they are dependent upon the encoding and decoding circuitry described below.

Figure 4:
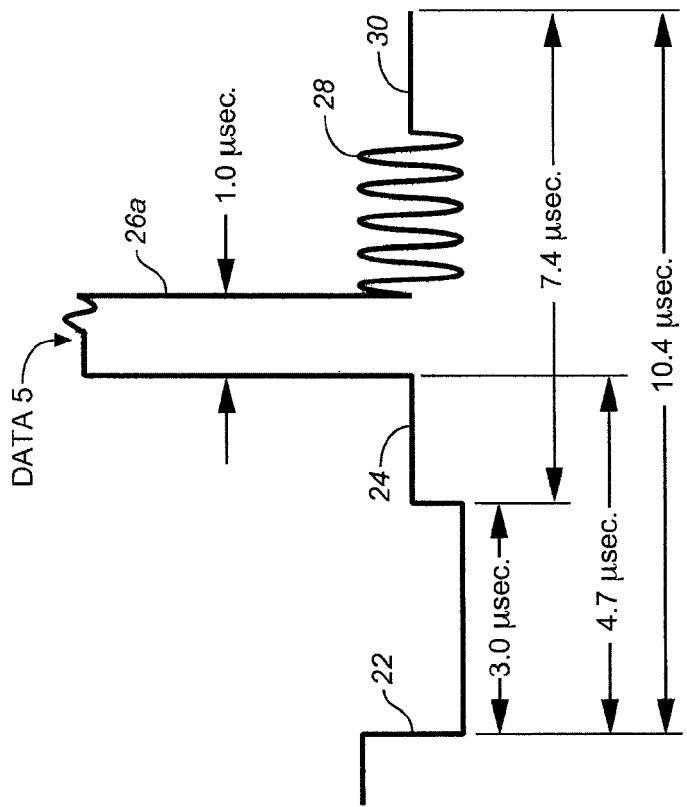
FIG. 4 shows a back porch pulse encoded waveform.

FIG. 4 shows a back porch pulse (BPP) 26a mostly the same as pulse 26 in FIG. 2, but here carrying data designated as "Data 5" carried on the tip of pulse 26a identically to "Data 1" in FIG. 3b. In this sense, such back porch pulses are similar to the above-described use of AGC pulses in the horizontal blanking intervals to carry data.

In accordance with this disclosure, the encoding of the video signal as shown in FIGS. 3a and 3b and 4, which of course is extended to as much of the video signal as desired, is provided for instance by a set top box of the type provided to cable and video satellite subscribers. When, for instance, a particular program is received and played by the set top box and is output to the TV receiver in analog form, the set top box installs (encodes) the data as desired.

In other versions, such as when television is transmitted in analog form, such as conventional broadcast television or conventional cable or satellite television, the encoding may be placed on the video signal at the "head end" by the cable or satellite television or broadcasting organization.

In the corresponding decoding process, a television set or personal video recorder or personal computer or suitably modified videocassette recorder which receives the video signal of FIGS. 3a and 3b or 4 and belongs to the consumer detects in an input analog video signal the presence of the data bits shown in FIGS. 2b and 4 and determines from the associated encoded data what type of storage is permissible and the duration of storage or other control or use information. Since the data bandwidth is substantial, in addition to control purposes, also for instance graphics information might be provided by the encoded data identifying a program or providing commentary on the program in textual form. It is to be understood that a VCR or personal video recorder or personal computer or DVD recorder which is compatible with this system includes detection (decoding) circuitry for detecting the encoded digital data pulses. This also requires suitable additional logic processing capability in the playing device, referred to here as a decoder. Hence, a compatible playing device compatible with this system differs in this regard from conventionally available such devices.

Also contemplated is a record carrier, such as an otherwise conventional video tape or other medium carrying video signals, which carries a video signal modified in accordance with the above encoding method. Such a record carrier product would use the present method in, e.g., a proprietary system for communication of sensitive data that could be considered classified and may only be decrypted by a special piece of decoding equipment. To the uninformed user the medium would appear and play like any other equivalent medium, e.g., the medium would look like a VHS tape and play like a VHS tape, but the data can be decoded only by a modified reader/reproducer of that VHS tape. Alternatively, a specially-modified DVD (or other digital media) player could read or extract digital information from an unused or otherwise reserved portion of an MPEG transport stream on a DVD (for example, but not limited to an "other camera angle" portion of the video program), and that data could be encoded onto the analog video outputs of the modified DVD player.

Figure 5A:
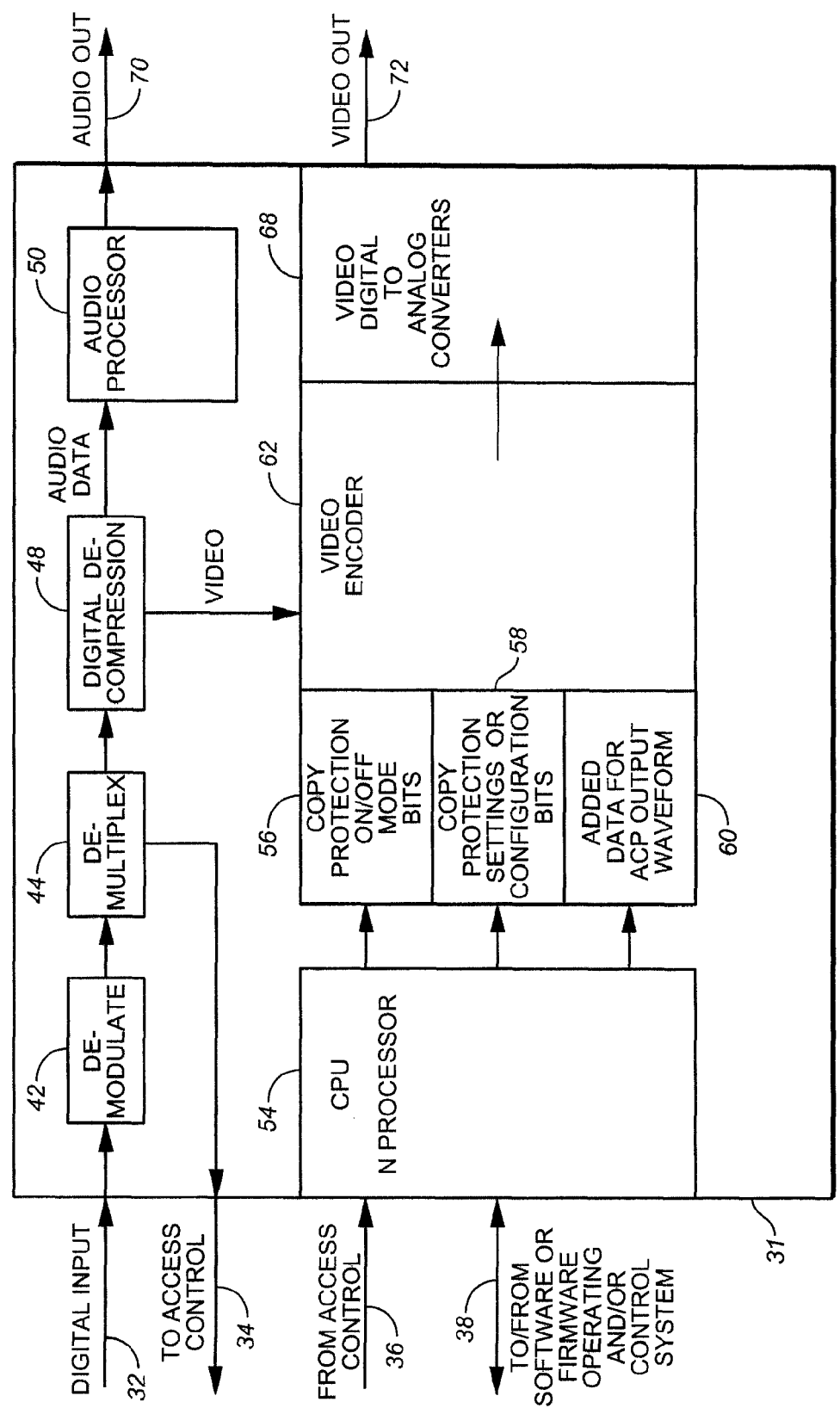
FIG. 5a shows a block diagram of an encoder in accordance with this disclosure.

A suitable encoder 31 for providing the encoded signals of FIGS. 3a, 3b and FIG. 4 is shown in FIG. 5a in block diagram form. It is to be understood that such an encoder may take many forms, such as including one or more integrated circuits and may be in fact be combined with other circuitry in for instance, a television set top box. Also, more functions of the encoder may be accomplished in software executed by a processor (CPU) rather than in the hardware oriented embodiment shown in FIG. 5a. Encoder 31 is not necessarily a standalone device. The video output port terminal 72 of encoder 31 outputs the analog video including the desired encoded digital data. This analog signal is then suitable for input to, for instance, a television set or personal video recorder or videocassette recorder or DVD recorder.

In detail, FIG. 5a shows conventional terminals (ports) 32, 34, 36 and 38 for respectively the conventional digital video input, access output control 34, access input control 36, and input control port 38 for providing the needed digital data. Demodulator 42, demultiplexer 44 and decompression circuitry 48 are conventional. The resulting audio data is coupled to audio processor 50 and output at terminal 70. Central processing unit (CPU) 54 receives the control signals and data from terminals (ports) 36 and 38 and hence controls the video encoder 62. Video encoder 62 includes storage elements (memory or registers) 56, 58, and 60, of which elements 56 and 58 are conventional and element 60 stores the "ACP" (anticopy protection) digital data to be encoded on the AGC or back porch pulses in accordance with this disclosure. Video encoder 62 installs the digital data, and also controls the other aspects of copy protection installation, on the video received from decompression circuit 48. Then this encoded digital video is converted to analog form by conventional converters 68 and output to port 72.

Figure 5B:
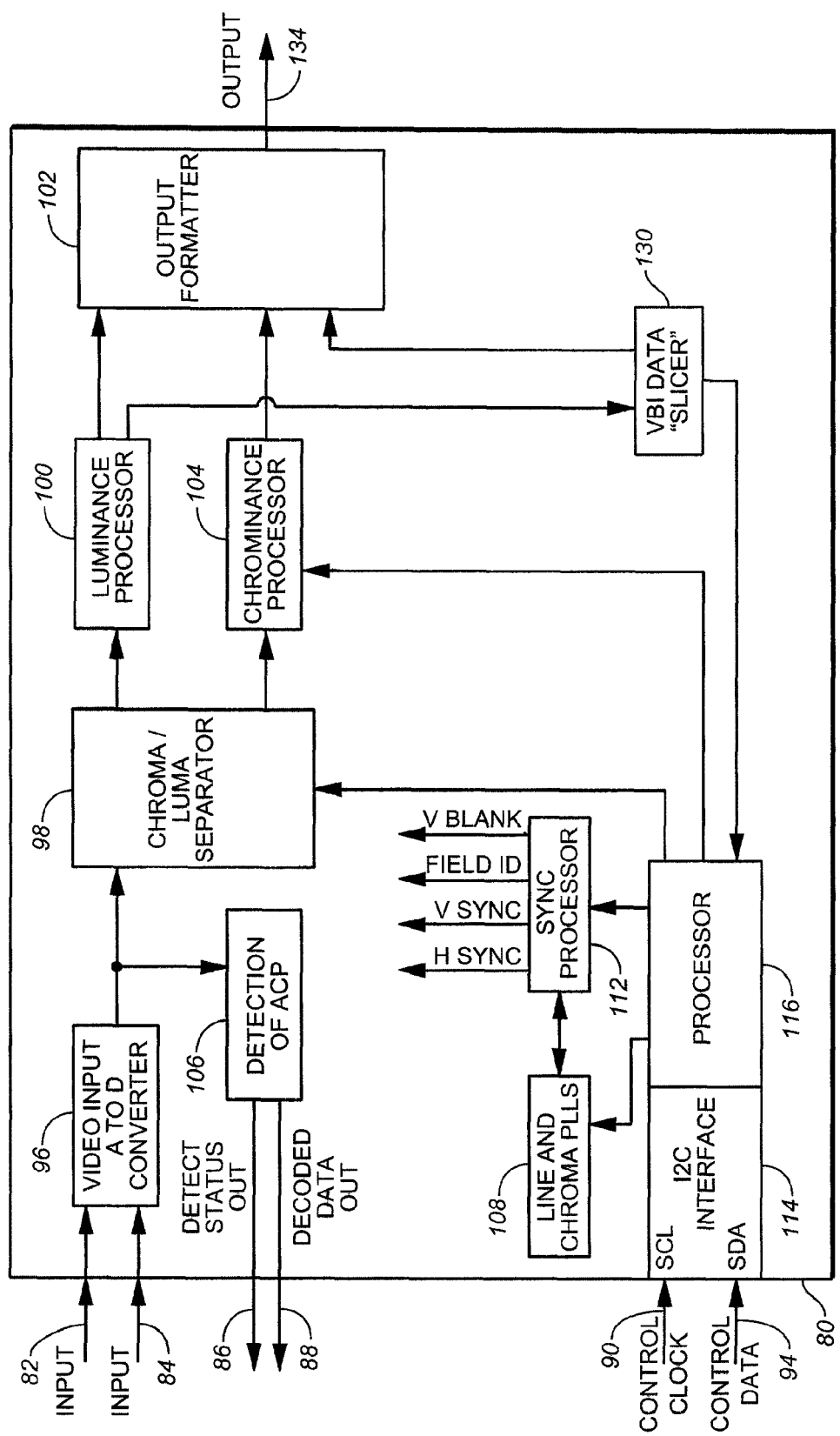
FIG. 5b shows a decoder in accordance with this disclosure.

FIG. 5b shows a complementary decoder 80 compatible with the encoder of FIG. 5a and suitable for instance in a personal video recorder or DVD recorder or videocassette recorder or personal computer that is equipped with a video capture card. While the functionality of encoder 80 is shown as being embodied largely in the digital realm (as in the encoder of FIG. 5a), some of the functions may be accomplished also in the analog realm; this is a matter of design choice. Decoder 80 may be part of a cable/satellite TV set top box which is also receiving analog video. In detail, decoder 80 operates as follows. Input ports 82, 84 receive analog video encoded as described above. This video is conventionally converted to digital form by converter 96 and the resulting digital video coupled to "ACP" detector 106 which detects the presence of the encoded data and decodes it into digital form to be output at respectively ports 86 and 88. All remaining elements of decoder 80 are conventional and include chroma-luma separator 98, luminance processor 100, output formatter 102 and chrominance processor 104. Further, the conventional 12C interface 114 is coupled to receive control clock signals (SCL) at port 90 and control data signals (SDA) at port 94, and couples these to the CPU processor 116.

Also provided are luma and chroma phase lock loops (PLL) 108 and horizontal and vertical sync processor 112. VBI (vertical blanking interval) data slicer 130 provides the needed timing data relating to the VBIs to processor 116.

This disclosure is illustrative and not limiting. Further modifications will be apparent to those skilled in the art in light of this disclosure and are intended to fall within the scope of the appended claims.

What is claimed as new and desired to be protected by Letters Patent of the United States is:

1. A method comprising the acts of:
   providing digital data;
   providing a video signal;
   providing in the video signal in blanking intervals thereof, and following a horizontal synchronization pulse, pulses of a type to inhibit subsequent analog video recording of the video signal; and
   encoding the digital data onto an extremity of at least one of the provided pulses.

2. The method of claim 1, wherein the blanking interval is a horizontal blanking interval or a vertical blanking interval.

3. The method of claim 1, wherein the encoded digital data does not substantially reduce the inhibition of subsequent analog video recording.

4. The method of claim 1, wherein each pulse extremity accommodates at least 10 bits of the digital data.

5. The method of claim 1, wherein each bit of the encoded digital data has a duration in the range of $1/10$ to $1/3$ μ sec.

6. The method of claim 1, wherein each bit of the encoded digital data has an amplitude in the range of 25 mV to 125 mV.

7. The method of claim 1, wherein the provided pulses are positive-going with respect to the negative-going horizontal synchronization pulse.

8. The method of claim 1, wherein the provided pulses are AGC or back porch pulses.

9. The method of claim 1, wherein the encoded digital data carries information relating to one of copy protection, storage control, network access, entitlement, user identification, mobile device activation, or mobile device registration.

10. A method comprising the acts of:
    receiving an analog video signal having in blanking intervals thereof, and following a horizontal synchronization pulse, pulses of a type to inhibit video recording of the video signal; and the extremity of at least one of the pulses carrying encoded digital data;
    detecting the encoded digital data; and
    decoding the detected digital data to form a digital data signal.

11. The method of claim 10, wherein the blanking intervals are horizontal blanking intervals or vertical blanking intervals.

12. The method of claim 10, wherein the encoded digital data does not substantially reduce the inhibition of subsequent analog video recording.

13. The method of claim 10, wherein each pulse extremity accommodates at least 10 bits of the digital data.

14. The method of claim 10, wherein each bit of the encoded digital data has a duration in the range of $1/10$ to $1/3$ μ sec.

15. The method of claim 10, wherein each bit of the encoded digital data has an amplitude in the range of 25 mV to 125 mV.

16. The method of claim 10, wherein the pulses are positive-going with respect to the negative-going horizontal synchronization pulse.

17. The method of claim 10, wherein the pulses are AGC pulses or back porch pulses.

18. The method of claim 10, wherein the encoded digital data carries information relating to one of copy protection, storage control, network access, entitlement, user identification, mobile device activation, or mobile device registration.

19. Apparatus for encoding digital data onto an analog video signal, comprising:
    an input terminal for receiving a digital video signal;
    an input terminal for receiving digital data;
    a video encoder coupled to the input terminals to provide in the video signal in blanking intervals thereof, and following a horizontal synchronization pulse, pulses of a type to inhibit subsequent analog video recording of the video signal, and to encode the digital data into an extremity of at least one of the provided pulses;
    a digital to analog converter coupled to the video encoder to convert the video signal to analog form; and
    an output terminal coupled to the digital to analog converter.

20. Apparatus for decoding digital data carried on an analog video signal, comprising:
    an input terminal for receiving an analog video signal;
    an analog to digital converter coupled to the input terminal;
    video processing circuitry coupled to the converter to output the video signal in digital form;
    a decoder coupled to the converter and which detects in the converted video signal in blanking intervals thereof, and following a horizontal synchronization pulse, pulses of a type to inhibit video recording of the video signal, and wherein the decoder detects at the extremity of at least one of the detected pulses encoded digital data and decodes the detected digital data; and an output terminal coupled to the decoder and which outputs the decoded digital data as a digital data signal.

* * * * *